Figure 1:
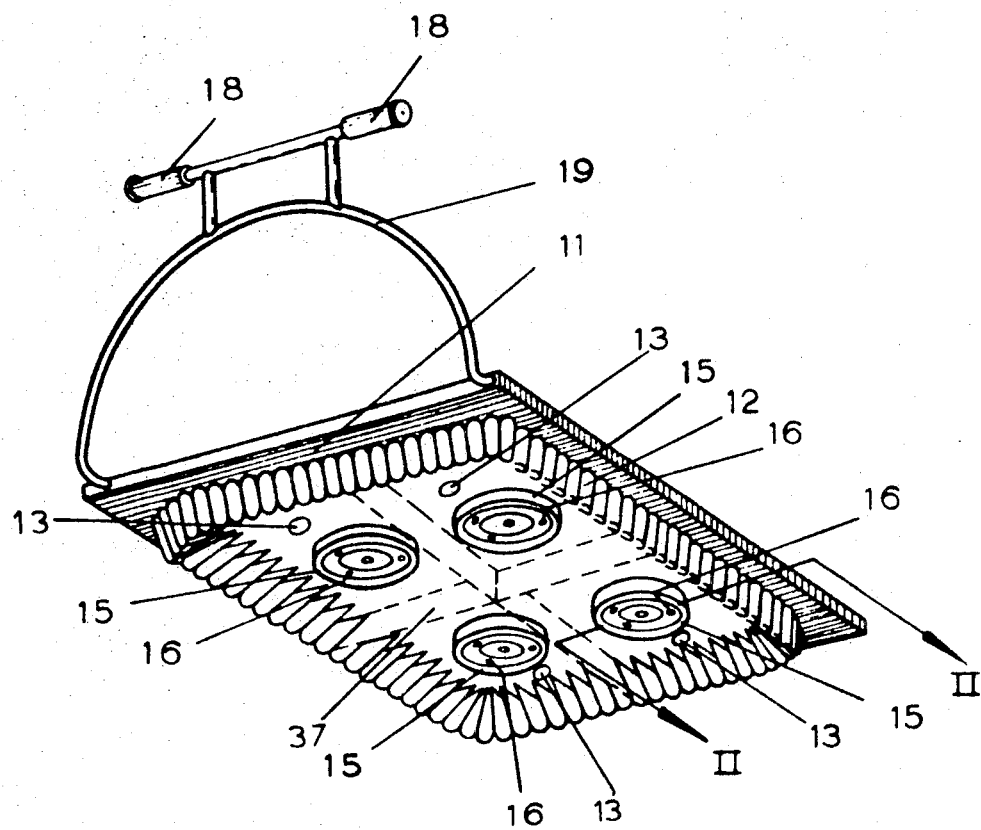

United States Patent

[11] 3,592,285

| [72] | Inventor | Bruce Thomas Noble<br>Cowes, England |
|---|---|---|
| [21] | Appl. No. | 782,297 |
| [22] | Filed | Dec. 9, 1968 |
| [45] | Patented | July 13, 1971 |
| [73] | Assignee | British Hovercraft Corporation Limited<br>Yeovil, Somerset, England |
| [32] | Priority | May 8, 1968 |
| [33] | | Great Britain |
| [31] | | 21688/68 |

[54] AIR CUSHION SUPPORTED PLATFORMS
8 Claims, 6 Drawing Figs.

[52] U.S. Cl.................................................. 180/124,
180/119, 180/121
[51] Int. Cl........................................................ B60v 1/02
[50] Field of Search............................................ 180/121,
124, 125, 119, 127

[56] References Cited
UNITED STATES PATENTS

| 3,409,103 | 11/1968 | Tripp............................ | 180/127 |
| 3,493,071 | 2/1970 | Street et al..................... | 180/124 |
| 3,247,921 | 4/1966 | Latimer Needham et al. | 180/124 |
| 3,313,367 | 4/1967 | Swedburg....................... | 180/124 X |
| 3,327,799 | 6/1967 | Guienne et al................. | 180/124 |
| 3,346,063 | 10/1967 | Bertin............................. | 180/121 |

*Primary Examiner*—A. Harry Levy
*Attorney*—Larson, Taylor & Hinds

ABSTRACT: A load bearing platform of the air cushion supported type comprises a platform, a flexible skirting assembly adapted to restrict the escape of air from a cushion area beneath the platform, means for supplying pressurized air to the cushion area, and at least one platform lifting means carried by the platform, the lifting means being extendible to an operative position where it is adapted to support the platform until the supporting cushion is formed, and thereafter being retracted to an inoperative position. Exemplary lifting means comprise flexible inflatable diaphragms or pneumatically actuated wheels or rollers.

AIR CUSHION SUPPORTED PLATFORMS

This invention relates to air cushion vehicles, and more particularly to load bearing platforms.

Air cushion supported load bearing platforms may have on their underside a plurality of diaphragms which define pads of pressurized air to support the platform. Such diaphragms provide a very small clearance over the operating surface, and are unsuitable for use over unprepared ground. To provide an air cushion supported platform suitable for use over unprepared ground, it is advantageous to use air cushion barriers consisting of discrete flexible segments. Such barriers, however, have the disadvantage that when the platform is inoperative they crease and crumple and do not act as a barrier. Thus when air is fed into the cushion space it leaks away and no air cushion is generated.

It is an object of the invention to provide a load bearing platform with a cushion barrier of discrete segments under which an air cushion can be generated.

According to the invention I provide a load bearing platform which receives support from at least one cushion of pressurized fluid, the cushion being bounded by a flexible skirting assembly and including means for supplying and maintaining the fluid cushion beneath the platform and one or more platform lifting means located on the platform. The lifting means may be located within the fluid cushion area and operate to lift the platform from an inoperative position when not receiving fluid cushion support, to a substantially operative position in which the flexible skirting assembly forms an efficient fluid cushion barrier, the lifting means being arranged to return to an inoperative position when the fluid cushion or cushions have been generated.

The flexible skirt assembly may be of the form disclosed in U.S. Pat. No. 3,211,246, and preferably may take the form of independent corrugations.

The fluid used to support the platform may be air pressurized by a compressor carried on the platform, or pressurized air may be supplied from any suitable source separate from the platform by way of a flexible hose.

The supply of air to the air cushion area may be separate from the supply of air to the lifting means, and each supply may be separately controlled by an operator.

Inflatable flexible diaphragms, attached to the underside of the load bearing platform, may act as lifting means. The diaphragms may be of the corrugated form disclosed in U.S. application, Ser. No. 728,130 now U.S. Pat. No. 3,513,935, so that, in an arrangement using separate air supplies, the diaphragms return to a retracted position when the load bearing platform has been raised and the air supply to the diaphragm is stopped. In an arrangement using one common air supply the diaphragms may also be of the corrugated form described above, the diaphragm inflating fluid which escapes from the orifices in the diaphragms being used to create and maintain the platform supporting fluid cushion. The area of the orifices may be such that when the cushion has been generated the fluid pressures on each side of the diaphragm become substantially equal, allowing the diaphragm to retract automatically.

Alternatively, the lifting means may consist of wheels arranged to be lowered pneumatically or by other suitable means so that the action of lowering the wheels raises the load bearing surface.

The air cushion area may be subdivided into a plurality of supporting cushions to provide stability for the platform. Alternatively, if wheels are used for providing the initial lift, they may be spaced apart and may provide stability by being lowered the appropriate distance to contact the ground.

Figure 2:
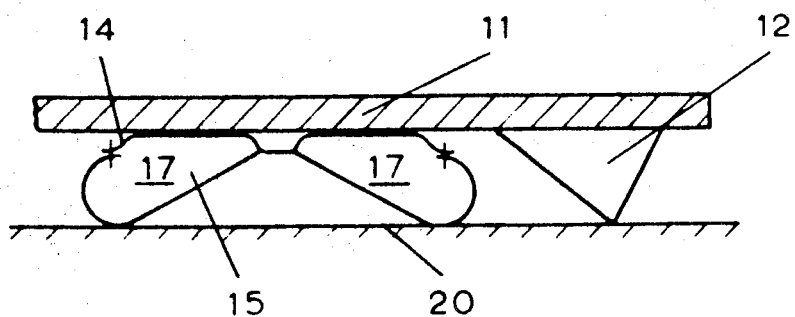
Figure 3:
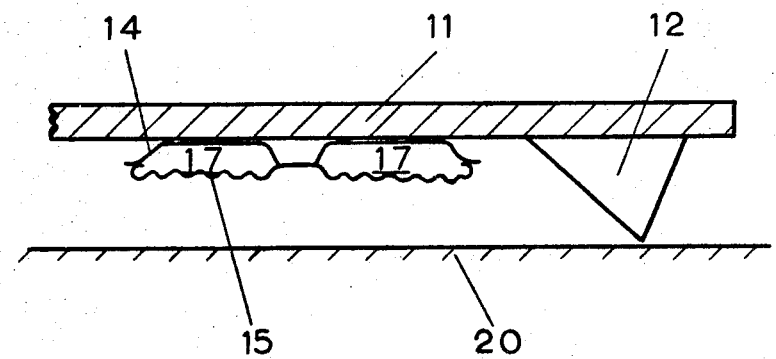
Figure 4:
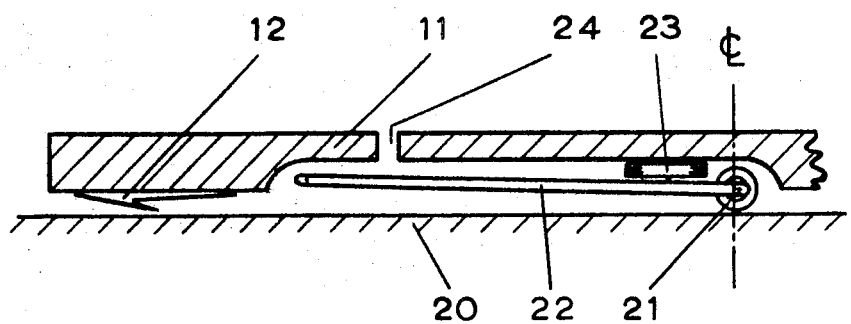
Figure 5:
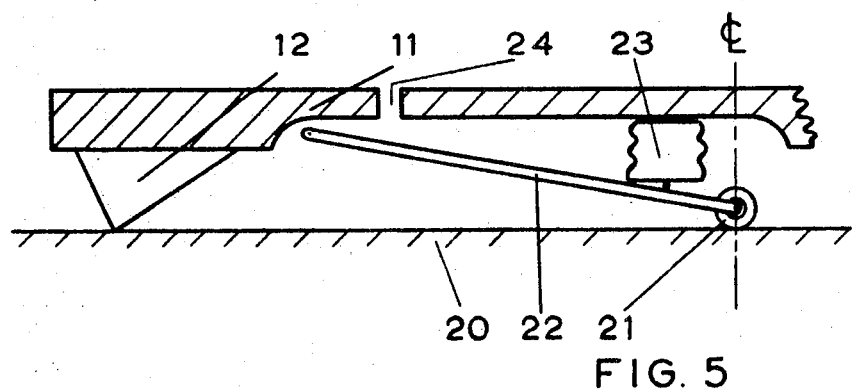
Figure 6:
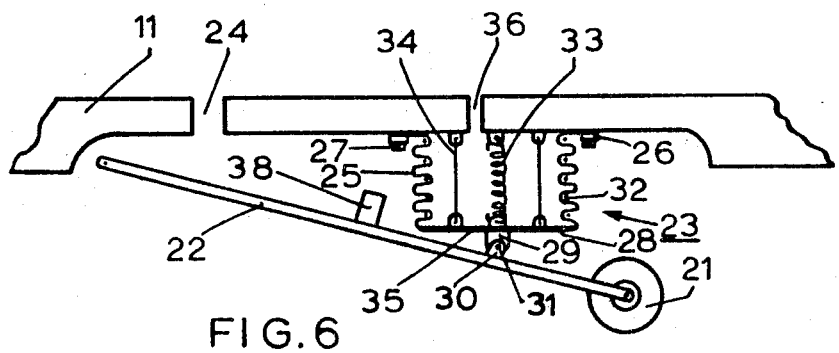

The invention will now be described, by way of example, with reference to the accompanying drawings, in which:

FIG. 1 is a perspective view of the underside of the load bearing platform,

FIG. 2 is a diagrammatic section on an enlarged scale on the line II—II in FIG. 1, FIG. 3 is the platform illustrated in FIG. 2 with the lifting diaphragm in the inoperative position, FIG. 4 is a diagrammatic section in a vertical plane of part of the load bearing platform illustrating another embodiment of the invention, FIG. 5 is the platform illustrated in FIG. 4 in the raised position, and FIG. 6 is a detail section view of the pneumatic lifting device shown in FIGS. 4 and 5.

A load bearing platform 11 is supported by an air cushion having a barrier in the form of a flexible skirt 12 depending from its underside. The flexible skirt 12 depends from the perimeter of the load bearing platform and is of corrugated form in planview, as described in U.S. Pat. No. 3,211,246. Preferably the webs of adjacent corrugations are not joined together, so that the skirt is comprised of a series of side by side independent members, often referred to as segments. Air is fed from a compressor (not shown), which may be separate from the load bearing platform through orifices 13 in the underside of the load bearing platform to generate and maintain the air cushion.

Supported on the underside of the load bearing platform 11 by supports 14 are diaphragms 15 moulded in the convoluted form illustrated in FIG. 3 and described in said U.S. Pat. No. 3,513,935. The diaphragms 15 are provided with orifices 16. Pressurized air is fed to the space 17 between the diaphragm support 14 and the diaphragm 15.

Air supply to the cushion and to the space 17 is separately regulated by valves controlled by an operator. Conveniently the controls 18 are positioned on the guiding handle 19 and are in the form of twistgrips.

When the load bearing platform 11 is not air supported it rests on bearing feet or casters (not shown) and the flexible skirt 12 is folded or crumpled between the underside of the platform 11 and the ground 20. In this condition the diaphragm 15 is in the configuration illustrated in FIG. 3. When the platform is brought into use pressurized air, under the control of the operator, is fed into the spaces 17 and the diaphragms 15 extend, raising the platform to its operating height. In the operating position the platform allows the flexible skirt 12 to extend and form an airtight wall. Air is now admitted to the air cushion space by the operator and the platform becomes air cushion borne. Once the platform is air cushion borne the operator shuts off the supply of air to the space 17 and the air in this space escapes through the orifices 16 and allows the diaphragms 15 to return to the configuration shown in FIG. 3.

In a variation of this embodiment of the invention the orifices 16 in the diaphragms 15 are sufficiently large to permit the flow of the cushion forming air. To raise the platform the operator introduces an excessive supply of air to the spaces 17 and once the platform is raised the supply of air is reduced to that necessary to maintain the cushion. The size of the orifices 16 is such that the pressure in the spaces 17 is able to equalize with the air cushion pressure, and the diaphragms return to the configuration illustrated in FIG. 3.

The cushion space may be subdivided by suitable flexible barriers 37, shown dotted in FIG. 1, to provide stability for the platform.

In another embodiment of the invention (FIGS. 4, 5, and 6) wheels or rollers 21 on radius arms 22 are housed in recesses on the underside of the load bearing platform 11. Pneumatic means 23 extend the wheels or rollers 21 away from the underside of the load bearing platform. One end of a flexible air impermeable bellows 25 is secured in an airtight manner to the underside of the load bearing platform by a clamp ring 26 secured by screws 27. The other end of the bellows is bonded to a rigid plate 28 which is pivotally attached to the radius arm 22 through lugs 29 and 30 and pin 31. Metal rings 32 are fitted to restrain the bellows when inflated. A return spring 33 and two cables 34 of fixed length, are secured between the platform 11 and the rigid plate 28. A bleed orifice 35 is provided in the plate 28, and air supply orifices 36 admit air under pressure to the inside of the bellows.

Air cushion generating air is fed from compressor (not shown) by way of orifices 24 to the air cushion area. The air to the air cushion and the air to the pneumatic means are separately regulated by an operator, the controls being twistgrips on the guiding handle similar to those illustrated in FIG. 1.

When the wheels are in a position adjacent to the underside of the platform, a stop 38 on the radius arms 22 abuts the underside of the platform 11 to provide a convenient means of moving a platform which is not air cushion supported. They also act as bearer feet to prevent the folded flexible skirt from being pinched between the platform and the ground. To raise the platform air is admitted through the orifices 36 to inflate the bellows 25 and force the wheels away from the underside of the platform until the platform reaches its operating height, when the flexible skirt 12 will be extended to form an airtight wall. Air is now admitted to the area beneath the platform through orifices 24. Once the air cushion has been generated the wheels may be either retracted or, if desired, they may remain extended to take part of the load and provide stability about one axis, or to stop the platform drifting sideways when it is being moved across an inclined surface. To retract the bellows the air supply through the orifice 36 is stopped, thus permitting the spring 33 to return the wheel to its stowed position with the stop 37 abutting the underside of the platform, the air within the bellows escaping through the bleed orifice 35.

I claim:

1. A load bearing platform device of the air cushion supported type, comprising a platform; a flexible skirting assembly carried by said platform and adapted to restrict the escape of air from a cushion area beneath said platform; at least one lifting means carried by said platform, and being selectively extendible downwardly to bear against a supporting surface to lift said platform to permit said skirting assembly to extend downwardly therefrom to form a wall about said cushion area and being selectively retractable upwardly toward said platform so as to increase the operating clearance of the platform when supported by an air cushion within said flexible skirting assembly; and means for selectively effecting extension of said lifting means to bear against the supporting surface and lift said platform such that said skirting assembly extends downwardly to encompass said cushion area, pressurization of said cushion area such that the device becomes cushion borne, and retraction of said lifting means while said cushion area remains pressurized and said platform remains supported by said pressurized cushion.

2. Apparatus as claimed in claim 1 wherein said lifting means comprises at least one pneumatically operable lifting member.

3. Apparatus as claimed in claim 2 wherein said pneumatically operable lifting member comprises a flexible inflatable diaphragm biased normally upwardly to a retracted position.

4. Apparatus as claimed in claim 3 wherein said means for selectively effecting extension of said lifting means, pressurization of said cushion area, and retraction of said lifting member comprises controllable air supply means communicating with said inflatable diaphragm and said cushion area.

5. Apparatus as claimed in claim 4 wherein sad controllable air supply means communicates separately with said inflatable diaphragm and said cushion area so as to permit separate pressurization and depressurization thereof.

6. Apparatus as claimed in claim 4, wherein said controllable air supply means communicates directly with said inflatable diaphragm, and said diaphragm is located within said cushion area and has orifices therein opening into said cushion area to pass pressurized air thereto, said orifices being sized such that the pressure inside the inflatable diaphragm can equalize with the air cushion pressure so as to permit retraction of the inflatable diaphragm while cushion pressure is maintained at least in part by air passing through said orifices.

7. Apparatus as claimed in claim 1 wherein said lifting means comprises a wheellike member.

8. Apparatus as claimed in claim 7 wherein sad lifting means comprises pneumatically operable means for selectively extending and retracting said wheellike member.